United States Patent
Swinson et al.

(10) Patent No.: US 9,727,905 B2
(45) Date of Patent: Aug. 8, 2017

(54) SYSTEMS AND METHODS FOR DETERMINING COST OF VEHICLE OWNERSHIP

(71) Applicant: TrueCar, Inc., Santa Monica, CA (US)

(72) Inventors: Michael D. Swinson, Santa Monica, CA (US); Joel Martin Lander, Santa Monica, CA (US); Mikhail Semeniuk, Golden Valley, MN (US)

(73) Assignee: TrueCar, Inc., Santa Monica, CA (US)

( * ) Notice: Subject to any disclaimer, the term of this patent is extended or adjusted under 35 U.S.C. 154(b) by 0 days.

(21) Appl. No.: 14/137,194

(22) Filed: Dec. 20, 2013

(65) Prior Publication Data

US 2014/0279258 A1    Sep. 18, 2014

Related U.S. Application Data

(60) Provisional application No. 61/780,723, filed on Mar. 13, 2013.

(51) Int. Cl.
  *G06Q 30/00*    (2012.01)
  *G06F 17/30*    (2006.01)
  *G06Q 30/06*    (2012.01)

(52) U.S. Cl.
  CPC ................ *G06Q 30/0625* (2013.01)

(58) Field of Classification Search
  CPC .................................. G06Q 30/0625
  See application file for complete search history.

(56) References Cited

U.S. PATENT DOCUMENTS

| | | | |
|---|---|---|---|
| 5,774,873 A | 6/1998 | Berent et al. | |
| 5,940,816 A | 8/1999 | Fuhrer | |
| 6,006,201 A | 12/1999 | Berent et al. | |
| 7,660,758 B2 * | 2/2010 | Kwan | 705/36 R |
| 8,589,212 B2 | 11/2013 | Pollak et al. | |
| 8,818,881 B2 | 8/2014 | Himmerick et al. | |
| 9,189,960 B2 | 11/2015 | Couch et al. | |
| 2006/0178973 A1 | 8/2006 | Chiovari et al. | |
| 2006/0242089 A1 | 10/2006 | Vahidi | |

(Continued)

OTHER PUBLICATIONS

True Cost to Own—http://www.edmunds.com/tco.html [recovered from Internet Archive Feb. 14, 2012].*

(Continued)

*Primary Examiner* — Kathleen Palavecino
(74) *Attorney, Agent, or Firm* — Sprinkle IP Law Group

(57) ABSTRACT

Systems and methods for estimating the cost of vehicle ownership wherein, in one embodiment, a system includes a computer processor that is coupled to a network interface, a data storage device and an output device, the processor being configured to receive information identifying a user-specified vehicle of interest and interval of interest. The processor uses this information to identify and retrieve pre-calculated data items that are stored in the data storage device, and to request external data items from an external data source and receive the requested external data items via the network interface. The processor computes cost-of-vehicle-ownership (COVO) components for the vehicle of interest, sums the components to determine an overall COVO, and outputs the components and overall COVO to a user via the output device. The user may provide further input to modify the COVO calculation.

22 Claims, 5 Drawing Sheets

(56) References Cited

U.S. PATENT DOCUMENTS

| | | |
|---|---|---|
| 2007/0185777 A1 | 8/2007 | Pyle et al. |
| 2009/0006118 A1 | 1/2009 | Pollak |
| 2010/0088158 A1 | 4/2010 | Pollack |
| 2010/0179704 A1 | 7/2010 | Ozog |
| 2010/0274571 A1 | 10/2010 | McFall et al. |
| 2010/0274631 A1* | 10/2010 | McFall et al. .......... 705/10 |
| 2010/0299190 A1 | 11/2010 | Pratt |
| 2011/0082759 A1 | 4/2011 | Swinson |
| 2011/0119231 A1 | 5/2011 | Namburu |
| 2011/0202471 A1 | 8/2011 | Scott et al. |
| 2011/0231028 A1 | 9/2011 | Ozog |
| 2012/0136802 A1 | 5/2012 | McQuade |
| 2012/0233014 A1 | 9/2012 | Banks et al. |
| 2012/0284087 A1 | 11/2012 | Pollak |
| 2012/0284113 A1 | 11/2012 | Pollak |
| 2013/0066667 A1 | 3/2013 | Gulec |
| 2013/0218724 A1* | 8/2013 | Moretti et al. .......... 705/26.63 |
| 2014/0052328 A1 | 2/2014 | Nguyen et al. |
| 2014/0089208 A1 | 3/2014 | Humble et al. |
| 2014/0229391 A1 | 8/2014 | East, III et al. |
| 2014/0257934 A1 | 9/2014 | Chrzan et al. |
| 2014/0258044 A1 | 9/2014 | Chrzan et al. |
| 2014/0279020 A1 | 9/2014 | Duguid et al. |
| 2014/0279229 A1 | 9/2014 | Burgiss et al. |
| 2014/0279708 A1 | 9/2014 | Swinson et al. |
| 2014/0279709 A1 | 9/2014 | Lander et al. |
| 2015/0058152 A1 | 2/2015 | Pollak et al. |
| 2015/0206206 A1 | 7/2015 | Puente et al. |
| 2015/0324737 A1 | 11/2015 | Chrzan et al. |
| 2015/0324879 A1 | 11/2015 | Lu et al. |

OTHER PUBLICATIONS

Final Office Action issued for U.S. Appl. No. 14/137,228, mailed Dec. 19, 2016, 11 pages.

Notice of Allowance issued for U.S. Appl. No. 14/136,987, mailed Jan. 12, 2017, 7 pages.

Office Action for U.S. Appl. No. 14/137,228, mailed Aug. 15, 2016, 9 pgs.

Office Action for U.S. Appl. No. 14/136,687, mailed Aug. 18, 2016, 12 pgs.

Notice of Allowance issued for U.S. Appl. No. 14/137,228, dated Mar. 27, 2017, 6 pages.

Notice of Allowance issued for U.S. Appl. No. 14/136,687, dated Mar. 28, 2017, 6 pages.

* cited by examiner

| 2012 BMW 3-Series 335i on 02/16/2013 | | | | | |
|---|---|---|---|---|---|
|  | Year 1 | Year 2 | Year 3 | Year N | N-Year Total |
| Depreciation | $5,800 | $4,213 | $3,525 | $1,324 | $14,862 |
| Financing | $1,455 | $1,100 | $840 | $345 | $3,740 |
| Fuel | $2,744 | $2,771 | $2,799 | $2,827 | $11,142 |
| Taxes and Fees | $3,125 | $359 | $345 | $325 | $4,154 |
| Insurance | $1,911 | $1,950 | $1,970 | $1,999 | $7,830 |
| Maintenance and Repair | $0 | $0 | $1,522 | $2,250 | $3,772 |
| Total Cost to Own | $15,035 | $10,393 | $11,001 | $9,070 | $45,500 |

Average Price Paid: $41,690

Customer Incentives: $500

Your APR: 3.00%

FIG. 5

SYSTEMS AND METHODS FOR DETERMINING COST OF VEHICLE OWNERSHIP

CROSS-REFERENCE TO RELATED APPLICATION(S)

This application is a conversion of and claims a benefit of priority from U.S. Provisional Application No. 61/780,723, filed Mar. 13, 2013, entitled "SYSTEM AND METHOD FOR DETERMINING COST OF VEHICLE OWNERSHIP," which is incorporated by reference, with all appendices and attachments thereto, as if set forth herein in its entirety.

BACKGROUND

Field of the Invention

The invention relates generally to cost analysis and more particularly to systems, methods and computer program products for analyzing and determining the cost of ownership of high value items such as vehicles.

Related Art

Consumers are periodically faced with the prospect of making decisions with respect to high-value items such as vehicles, and it is often the case that the consumers are not well equipped to make these decisions. For example, when considering whether to purchase a vehicle, a consumer may be well aware of the list price of the vehicle, but it may be much less clear what the consumer's overall cost of owning the vehicle will be. This overall cost of ownership includes items such as fuel costs, insurance costs, financing costs, repair costs, and so on. Consumers may therefore have to rely on their intuition or "hunches" in making decisions about vehicle ownership.

Consumers may be able to obtain some information on the overall cost of ownership of a vehicle from various sources. For instance, it is not uncommon for vehicle-related publications to publish cost of ownership information when reviewing vehicles. Commonly, these publications will indicate typical costs for a set period of time, such as five years, beginning with the initial purchase of the vehicle. While this information is beneficial to the consumer, it is typically presented as a one-size-fits-all solution to the consumers' needs. In other words, the cost of vehicle ownership information is usually a static cost assessment for a typical vehicle, and is not differentiated for particular vehicles or for particular users.

It would therefore be desirable to provide tools that enable consumers (as well as dealers and others in the industry) to more accurately determine the cost of ownership of the specific vehicles in which the consumers are interested with respect to the information applicable to the particular consumers to whom the information is presented.

SUMMARY OF THE INVENTION

This disclosure is directed to systems and methods for estimating the cost of vehicle ownership that solve one or more of the problems discussed above. In one particular embodiment, a system includes a computer processor that is coupled to a network interface, a data storage device and an output device. The processor is configured to receive information identifying a user-specified vehicle of interest and a user-specified ownership interval of interest. The processor uses this information to identify and retrieve pre-calculated data items that are stored in the data storage device. The processor may also request external data items from an external data source and receive the requested external data items via the network interface. The processor then computes a cost of vehicle ownership for the vehicle of interest and outputs the cost of vehicle ownership to a user via the output device.

The processor may be configured to calculate and sum a plurality of subcomponents of the cost of vehicle ownership. The subcomponents may be computed based on the pre-calculated data items, requested external data items, and user-supplied data items. The processor may be configured to provide default data items and to enable replacement of these default data items with corresponding user-supplied data items. The processor may further be configured to receive user input after outputting the cost of vehicle ownership revise one or more of the data items used to compute the components of the cost of ownership according to the received user input, recompute the cost of vehicle ownership, and output the recomputed cost of vehicle ownership to the user via the output device. In one embodiment, the processor is configured to identify location information associated with the user; select one or more of the data items for the cost of ownership calculation based at least in part on the identified location information, and compute the cost of vehicle ownership using the selected, user-location-based data items. The processor may be configured to identify expected repair items, look up itemized repair costs for these items on the vehicle of interest in a database of stored repair costs; compute total repair costs specific to the vehicle of interest and the expected repair items, and sum the total repair costs with one or more other subcomponents of the cost of vehicle ownership.

An alternative embodiment comprises a method for determining costs of vehicle ownership. This method begins with receiving information in a computer system, where the information identifies a vehicle of interest and an ownership interval of interest. Then, one or more pre-calculated data items that are stored in a data storage device are identified and retrieved, and one or more external data items are requested and received from an external data source. A cost of vehicle ownership is computed for the vehicle of interest based on these data items, and is output to a user via an output device. The cost of ownership may be computed by calculating a plurality of subcomponents of the cost of vehicle ownership and then summing these subcomponents. The data items upon which the cost of ownership calculation is based may include various default values which may be overridden by user input or input available from other (e.g., external) data sources. The data items may include vehicle-specific and non-vehicle-specific information. The method may include identifying location information associated with the user, selecting data items based on the location information, and computing the cost of ownership using the location-based data items. The method may also include, after outputting the cost of vehicle ownership, receiving user input, revising one or more data items based on the input, recomputing the cost of ownership using the revised data items, and outputting the recomputed cost of vehicle ownership.

Another alternative embodiment comprises a computer program product for determining the cost of vehicle ownership. The computer program product comprises a non-transitory computer-readable storage medium that stores computer instructions translatable by a processor to perform a method substantially as described above.

Numerous other embodiments are also possible.

Embodiments of the invention provide a framework to assist consumers in making decisions about their vehicles. More specifically, embodiments provide new ways to determine the cost of owning a vehicle. According to one aspect of the invention, factors that may affect or influence the cost of vehicle ownership are identified and transformed into a plurality of computational components that can be used to objectively measure the cost of vehicle ownership. Exemplary factors may include, but are not limited to:

- price of a vehicle at a certain time (e.g., the purchase price when the vehicle was first purchased)
- down payment
- amount of principal that is left on a loan at a specified time
- fuel costs
- taxes and fees
- insurance costs
- maintenance and repair costs
- finance rate (e.g., annual percentage rate)
- mileage
- fuel efficiency (e.g., miles per gallon for a particular vehicle)

Those skilled in the art will recognize that additional factors may be included. Furthermore, not all factors may be necessary or applicable. For example, a vehicle may be purchased without a down payment and/or a loan. In some embodiments, some or all of the parameters used in constructing the factors may be user configurable. This unique approach of providing objective guidance with subjective user configurability is unprecedented and can provide unique advantages over conventional cost analysis methodologies in the manner in which cost of ownership computation is done and the way in which the resulting information is utilized. For example, embodiments can account for the complexity involved in determining maintenance and repair costs over various intervals. In some embodiments, the cost of ownership estimates for the same vehicle may vary for different users, For instance, the users' geographical locations may affect the amounts of taxes, fees, insurance, repair costs, etc. The improved accuracy of the information provided by the present embodiments can be useful in helping consumers to make informed decisions on whether to purchase a vehicle, how long to hold on to the vehicle, etc.

Embodiments can be advantageously adaptive and customizable in that users can change, isolate, and set limits with respect to various components utilized in determining the cost of vehicle ownership. For example, a user can change a crediting rating used in determining a financing component of the cost of vehicle ownership and be presented with a visualization that shows the effect of the change. This allows the user to fine tune the cost of vehicle ownership computation and obtain accurate estimates as to when the first major repair for a particular vehicle may occur, when may be the time to trade in the vehicle, etc.

The above embodiments and others will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

Other objects and advantages of the invention may become apparent upon reading the following detailed description and upon reference to the accompanying drawings.

FIG. 5 is a diagram illustrating an output displaying the cost of vehicle ownership in accordance with one embodiment.

Figure 1:
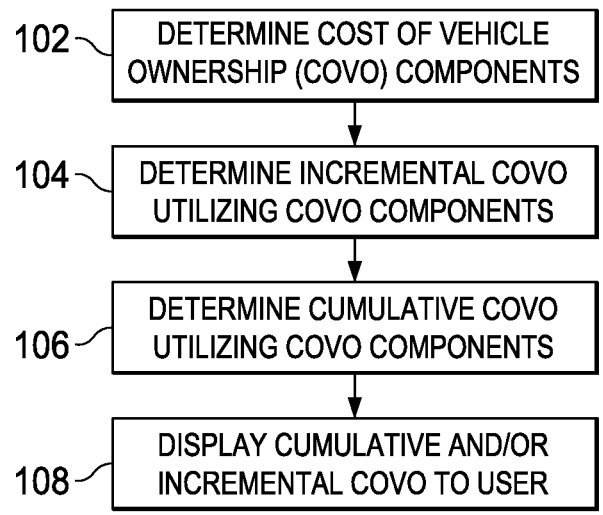
FIG. 1 is a flow diagram illustrating a simple exemplary embodiment of a method for determining cost of vehicle ownership.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the as defined by the appended claims. Further, the drawings may not be to scale, and may exaggerate one or more components in order to facilitate an understanding of the various features described herein.

DETAILED DESCRIPTION OF EXEMPLARY EMBODIMENTS

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

Before discussing specific embodiments, a brief overview of an exemplary embodiment may be helpful. As noted above, consumers may be able to easily determine the purchase price, but it is considerably more difficult to determine many of the other costs that are associated with vehicle ownership. One embodiment of the invention is therefore a computer system that enables a consumer to provide varying amounts of information, which is then used by the system to compute a number of different components of the cost of ownership of a vehicle. These components are summed to arrive at a total cost of ownership that is presented to the consumer. The consumer can, in some embodiments, provide additional user input which is used to revise data items that are factored into the cost of vehicle ownership, resulting in a revised value for the cost of ownership.

In one embodiment, the system may include a central server that processes the relevant data to produce the cost of vehicle ownership. This server is coupled to a local data storage device which is used to store collected and precalculated data items. For instance, the data storage device may store information on vehicle repair costs, etc. The server may also be coupled to various external data sources that can be queried by the server for current values of various information items that are used in the computation of the cost of vehicle ownership. These information items may include, for example, finance rates, and the like. The server may also be coupled to one or more input/output devices that allow the server to receive information directly from a user. This information may be used in the initial computation of the cost of vehicle ownership and/or computation revised cost of ownership values.

The various embodiments disclosed herein may provide a number of advantages over prior art systems and methods. For example, while prior art systems and methods typically provide static, pre-calculated assessments of the cost of vehicle ownership (e.g., five-year cost of ownership for a given make and model), embodiments may utilize vehicle-specific and user-specific information to generate a cost of ownership value that accounts for different vehicle and user characteristics, and is therefore more accurate than prior art estimates. For instance, the vehicle may be a used vehicle that has a lower cost of depreciation than a new vehicle, or the user may drive the vehicle fewer miles on a monthly basis than may be assumed in a static cost of ownership estimate. Embodiments of the invention may also provide a more flexible means for generating an estimated cost of vehicle ownership that allows users to determine the cost of ownership for different time intervals, different locations and so on.

Cost of vehicle ownership (COVO) is used herein to refer to the net present value of all money flows a vehicle buyer incurs while owning a vehicle. COVO can include depreciation, financing, gasoline (or other fuel/energy), insurance, maintenance and repairs, and the cost of funds (also known as opportunity cost or discount rate). COVO can be a factor when a buyer selects among candidate vehicles. Vehicles with the same price can have different COVOs as a result of differences in one or more of the above components.

In some embodiments, COVO may be presented chronologically by year to the user's specifications. These embodiments may be have advantages over the prior art with respect to a number of factors that may include:

granularity and customization of results
use of proprietary computations of depreciation and average purchase price (as described in other patents)
comprehensive methodology for obtaining accurate maintenance & repair values
formulation as Net Present Value of cost of ownership Referring to FIG. 1, a flow diagram illustrating a simple exemplary embodiment of a method for determining cost of vehicle ownership (COVO) is shown. In this embodiment, at step 102, a plurality of COVO components are determined. Exemplary COVO components are described in detail below, and may include depreciation, financing costs, taxes and fees, insurance, and maintenance and repair costs. At step 104, incremental COVO is determined. This involves determining the incremental change to some or all of the COVO components relative to time. For instance, vehicle depreciation for year T relative to year T−1 may be determined. Other time intervals may also be possible. In some cases, incremental vehicle depreciation may be tied to loan payment(s) made in the same time period. This step is further explained in detail below. At step 106, a cumulative COVO may be determined. The cumulative COVO includes the various COVO components for each of the incremental time periods. The cumulative COVO is then presented at step 108 to a user via a user interface running on a client device.

Figure 2:
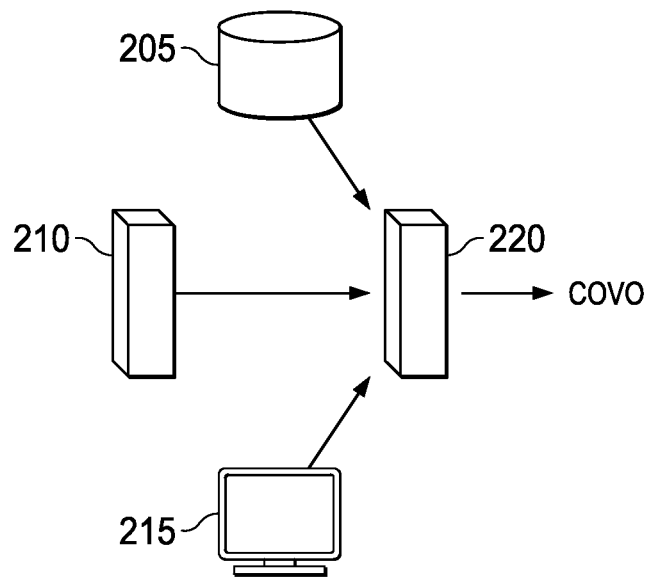
FIG. 2 is a diagram illustrating different types of data items that are used in determining the cost of vehicle ownership in one embodiment.

COVO is determined in some embodiments in response to a user request. In one embodiment, when the user's request has been received by a system that is configured to generate COVO, the system must obtain a number of data items that are used in the computation of the COVO components. These data items are obtained from three types of data sources. This is illustrated in FIG. 2.

The first type of data source (205) may be referred to as a back end or offline data source. This type of data source is typically a database or data warehouse that contains pre-calculated data items. These pre-calculated data items may include such things as residual value curves. Because these data items have been pre-calculated and stored, they can simply be retrieved from the data storage device when need for COVO computation. The data storage device is preferably a local device, rather than being remotely located from the system, so that it can be quickly accessed to retrieve the pre-calculated data items.

The second type of data source (210) may be referred to as a near-line data source. Near-line data sources are typically external to the system, and are commonly controlled by third parties (parties that do not own and/or control the system that is performing the COVO computation). This type of data source may be accessed to obtain external data items that are maintained and updated by the third parties. For instance, the system may access a third party database to request current financial information (e.g., interest rates) that is used in the computation of the financing cost component of COVO. External data items retrieved from near-line data sources typically requires more processing by the COVO system than pre-calculated data items retrieved from a back end data source.

The third type of data source (215) may be referred to as an online data source. This refers to data sources that are external to the COVO system, but do not require further processing by the system before they are useful in the determination of the respective COVO component. Further, the COVO system typically does not have to request the data items from the online source. One example of an online data source is the user that requests the COVO determination. The user may provide information such as the time interval over which the COVO determination is to be made. These online data items, along with the pre-calculated data items from the back end data source and the external data items from the near-line data source are provided to the COVO system (220), which uses them to generate the estimated COVO.

Figure 3:
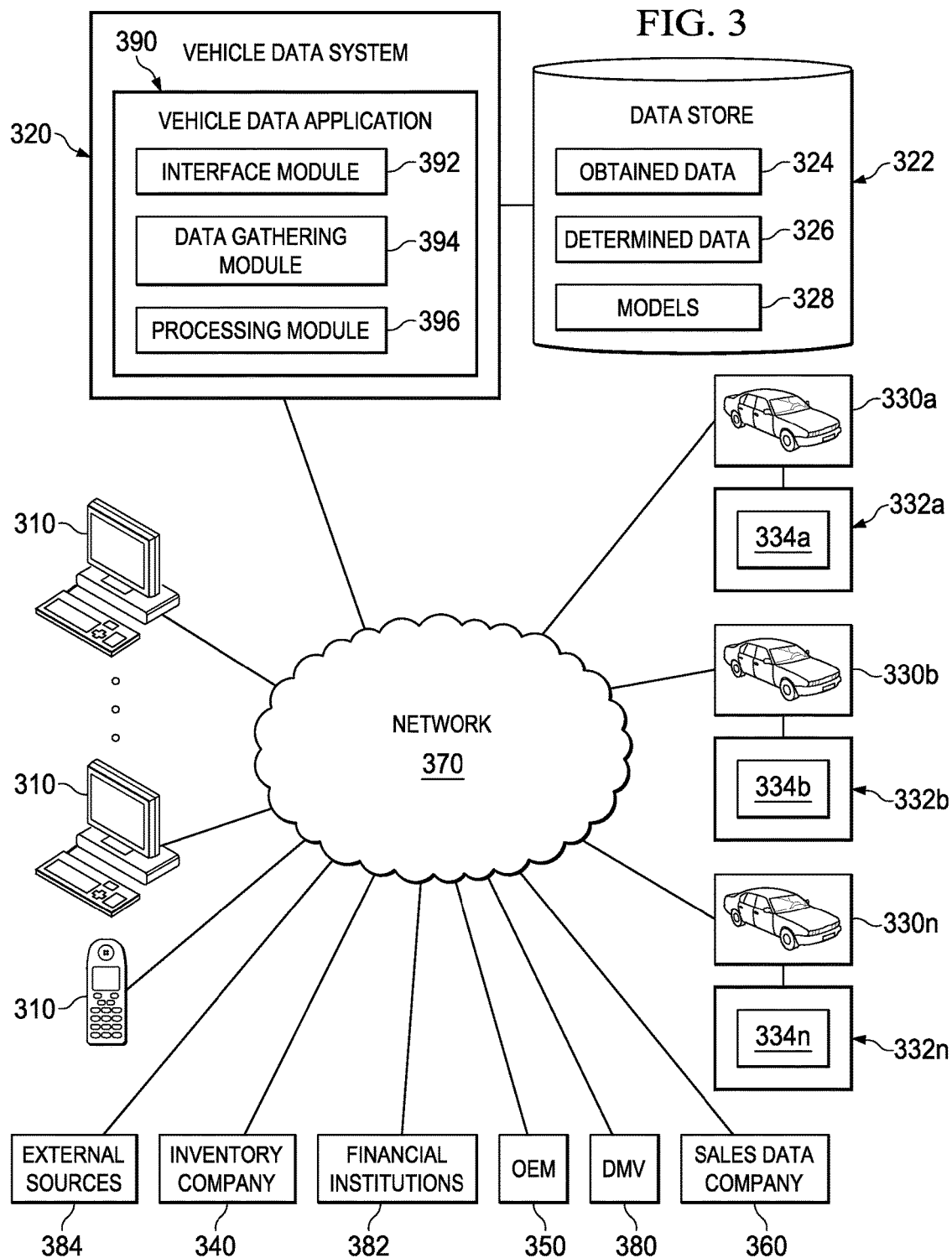
FIG. 3 is a diagram illustrating an exemplary topology for a computer system in which one embodiment is implemented.

There may be one or more of each of the different types of data sources, and the topology of the system may vary from one embodiment to another. One exemplary topology is illustrated in FIG. 3. Referring to FIG. 3, topology 300 comprises a set of entities including vehicle data system 320 (which may also be referred to herein as the TrueCar system) which is coupled through network 370 to computing devices 310 (e.g., computer systems, personal data assistants, kiosks, dedicated terminals, mobile telephones, smart phones, etc.), and one or more computing devices at inventory companies 340, original equipment manufacturers (OEM) 350, sales data companies 360, financial institutions 382, external information sources 384, departments of motor vehicles (DMV) 380 and one or more associated point of sale locations, in this embodiment, car dealers 330. Computing devices 310 may be used by consumers while conducting a search for consumer goods and/or services, such as automobiles. Network 370 may be for example, a wireless or wired communication network such as the Internet or wide area network (WAN), publicly switched telephone network (PTSN) or any other type of electronic or non-electronic communication link such as mail, courier services or the like.

Vehicle data system 320 may comprise one or more computer systems with central processing units executing instructions embodied on one or more computer readable media where the instructions are configured to perform at least some of the functionality associated with embodiments disclosed herein. These applications may include a vehicle data application 390 comprising one or more applications (instructions embodied on one or more non-transitory computer readable media) configured to implement an interface module 392, data gathering module 394 and processing module 396 utilized by the vehicle data system 320. Furthermore, vehicle data system 320 may include data store 322 operable to store obtained data 324, data 326 determined during operation, models 328 which may comprise a set of dealer cost model or price ratio models, or any other type of data associated with embodiments disclosed herein or determined during the implementation of those embodiments.

Vehicle data system 320 may provide a wide degree of functionality, including utilizing one or more interfaces 392 configured to, for example, receive and respond to queries from users at computing devices 310; interface with inventory companies 340, manufacturers 350, sales data companies 360, financial institutions 382, DMVs 380 or dealers 330 to obtain data; or provide data obtained, or determined, by vehicle data system 320 to any of inventory companies 340, manufacturers 350, sales data companies 360, financial institutions 382, DMVs 380, external data sources 384 or dealers 330. It will be understood that the particular interface 392 utilized in a given context may depend on the functionality being implemented by vehicle data system 320, the type of network 370 utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, or almost any other type of interface which it is desired to utilize in a particular context.

In general, then, using these interfaces 392 vehicle data system 320 may obtain data from a variety of sources, including one or more of inventory companies 340, manufacturers 350, sales data companies 360, financial institutions 382, DMVs 380, external data sources 384 or dealers 330 and store such data in data store 322. This data may be then grouped, analyzed or otherwise processed by vehicle data system 320 to determine desired data 326 or models 328 which are also stored in data store 322.

A user at computing device 310 may access the vehicle data system 320 through the provided interfaces 392 and specify certain parameters, such as a desired vehicle configuration or incentive data the user wishes to apply, if any. The vehicle data system 320 can select a particular set of data in the data store 322 based on the user specified parameters, process the set of data using processing module 396 and models 328, generate interfaces using interface module 392 using the selected data set on the computing devices 310 and data determined from the processing, and present these interfaces to the user at the user's computing device 310. Interfaces 392 may visually present the selected data set to the user in a highly intuitive and useful manner.

A visual interface may present at least a portion of the selected data set as a price curve, bar chart, histogram, etc. that reflects quantifiable prices or price ranges (e.g., "average," "good," "great," "overpriced," etc.) relative to reference pricing data points (e.g., invoice price, MSRP, dealer cost, market average, internet average, etc.). Using these types of visual presentations may enable a user to better understand the pricing data related to a specific vehicle configuration. Additionally, by presenting data corresponding to different vehicle configurations in a substantially identical manner, a user can easily make comparisons between pricing data associated with different vehicle configurations. To further aid the understanding for a user of the presented data, the interface may also present data related to incentives which were utilized to determine the presented data or how such incentives were applied to determine presented data.

Turning to the various other entities in topology 300, dealer 330 may be a retail outlet for consumer goods and/or services, such as vehicles manufactured by one or more of OEMs 350. To track or otherwise manage sales, finance, parts, service, inventory and back office administration needs dealers 330 may employ a dealer management system (DMS) 332. Since many DMS 332 are Active Server Pages (ASP) based, transaction data 334 may be obtained directly from the DMS 332 with a "key" (for example, an ID and Password with set permissions within the DMS system 332) that enables data to be retrieved from the DMS system 332. Many dealers 330 may also have one or more web sites which may be accessed over network 370, where pricing data pertinent to the dealer 330 may be presented on those web sites, including any pre-determined, or upfront, pricing. This price is typically the "no haggle" price (i.e., price with no negotiation) and may be deemed a "fair" price by vehicle data system 320.

Inventory companies 340 may be one or more inventory polling companies, inventory management companies or listing aggregators which may obtain and store inventory data from one or more of dealers 330 (for example, obtaining such data from DMS 332). Inventory polling companies are typically commissioned by the dealer to pull data from a DMS 332 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, AutoTrader.com, FordVehicles.com, etc.).

DMVs 380 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes.

Financial institution 382 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 360 may include any entities that collect any type of vehicle sales data. For example, syndicated sales data companies aggregate new and used sales transaction data from DMS 332 systems of particular dealers 330. These companies may have formal agreements with dealers 330 that enable them to retrieve data from dealer 330 in order to syndicate the collected data for the purposes of internal analysis or external purchase of the data by other data companies, dealers, and OEMs.

Manufacturers 350 can be those entities which actually build the vehicles sold by dealers 330. To guide the pricing of their vehicles, manufacturers 350 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 384 may comprise any number of other various source, online or otherwise, which may provide other types of desired data, for example data regarding vehicles, pricing, demographics, economic conditions, markets, locale(s), consumers, etc.

It should be noted here that not all of the various entities depicted in topology 300 are necessary, or even desired, in embodiments disclosed herein, and that certain of the functionality described with respect to the entities depicted in topology 300 may be combined into a single entity or eliminated altogether. Additionally, in some embodiments other data sources not shown in topology 300 may be utilized. Topology 300 is therefore exemplary only and should in no way be taken as imposing any limitations on embodiments disclosed herein.

As noted above, embodiments can provide a number of advantages over prior art systems and methods, such as improved granularity and customization of the generated COVO that is provided to the user. "Granularity" is used here to refer to the amount of differentiation between vehicles. For instance, in prior art systems, the available COVO information may be limited to a set number of static COVO results, where each of these results is associated with a specific vehicle make, model and year. If a consumer is considering two different vehicles that have the same make, model and year, but have substantially different characteristics (e.g., mileage, condition, repair history, etc.), the prior art COVO will be of no use to the consumer in regard to determining how these factors affect their respective COVOs. Similarly, If two different consumers in different geographical locations are considering identical vehicles, their respective COVOs may, in reality, be very different because of different fees, taxes, repair costs, fuel costs, etc., but these differences will not be reflected in prior art COVO calculations.

Embodiments disclosed herein, however, take into account various characteristics of the vehicle of interest and the consumer in computing the COVO components, and thereby provide a COVO result that is customized to the specific details of a particular user's situation. These embodiments may also take into account various factors that are variable and may result in different values for COVO if computed at different times.

Figure 4:
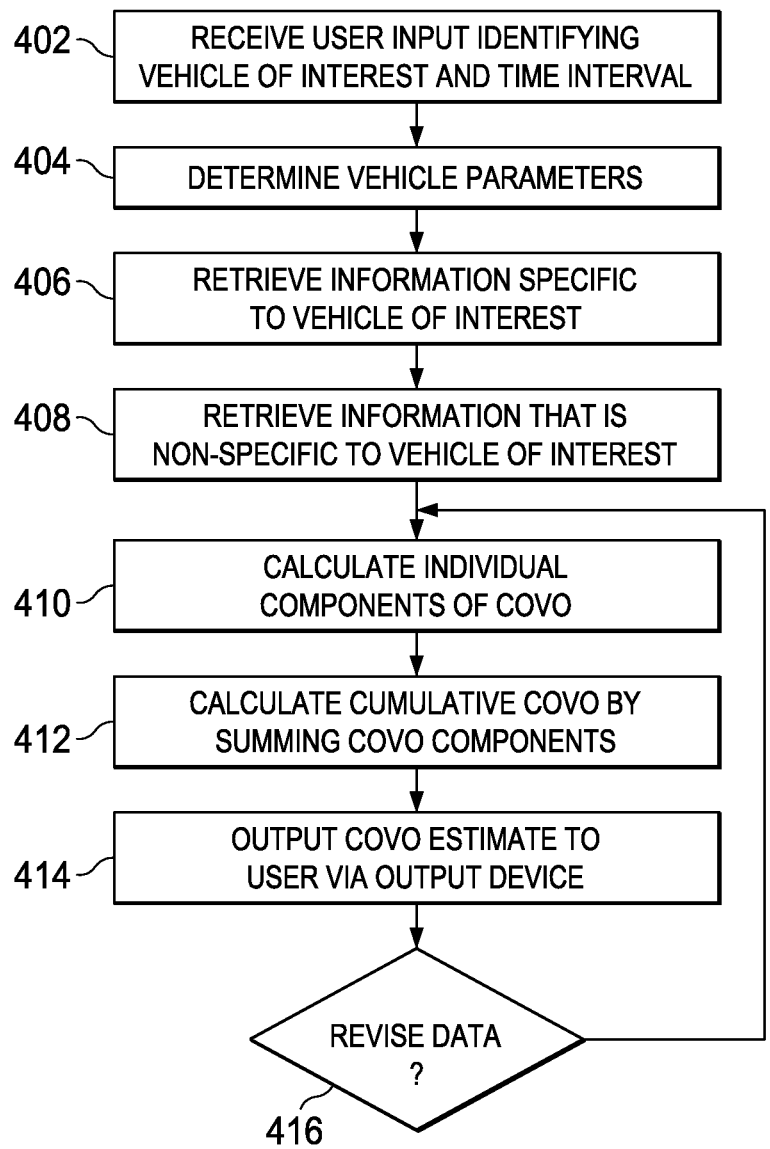
FIG. 4 is a flow diagram illustrating an exemplary method for determining the cost of vehicle ownership in accordance with one embodiment.

Referring to FIG. 4, a flow diagram illustrating an exemplary method in accordance with one embodiment is shown. In this method, the process of determining COVO begins with receipt of user input that identifies a vehicle of interest, as well as a time interval of interest (402). The vehicle of interest may be identified in any of a number of ways, and may specify the vehicle in varying levels of detail. For instance, the user input may identify as little as a make, model and year for the vehicle. Alternatively, the user may provide additional detail that enables the system to make a more accurate determination of its value and associated costs. For example, the user may input the VIN (vehicle identification number), mileage, or other vehicle-related information. In regard to the time interval for determining COVO, the user may select any desired interval. Although a five-year period is typical for static COVO determinations, the user may specify a shorter interval, a longer interval, or an interval that is not an integer number of years.

Based on the input received from the user, various parameters of the vehicle are determined (404). In one embodiment, given a particular make, model and year of the vehicle of interest, the system uses a corresponding set of default values for any parameters that are necessary to the COVO determination. These default values may be overridden by explicit user input for particular parameters. If a VIN is provided by the user, the system may be able to identify some of the vehicle parameters from the VIN. Based on the identified parameters for the vehicle of interest, the system can retrieve or request vehicle-specific information necessary for the COVO calculation (406), such as expected vehicle repairs/maintenance, vehicle repair costs, etc. The system may also retrieve various non-vehicle-specific information to be used in the COVO determination (408). Some of this information may be associated in varying degrees with the user (e.g., credit scores, insurance rates, etc.), while some of it may not be associated with the user at all (e.g., fuel prices, taxes, etc.)

When the system has requested, retrieved or otherwise obtained the information necessary to perform the various COVO component calculations, the respective computations are performed (410). Various ones of the component calculations may be dependent upon others (e.g., the residual value calculation may be dependent upon a computed purchase price), while others may proceed independently. When the COVO components have been calculated, they can be summed to arrive at the estimated COVO (412). The estimated COVO is then output to the user (414). The output presented to the user may be formatted in many different ways, and may include varying levels of detail. For instance, the output may include the overall COVO estimate, a breakdown of the COVO components, a breakdown of the COVO per year, comparisons of COVOs for different intervals, etc. An exemplary representation of the COVO can be displayed to the user as shown in FIG. 5

After the user has viewed the COVO generated by the system, he or she may wish to revise one or more of the data items upon which the COC computation was based. If so, the user can provide this input to the system (416), after which the system will recomputed the COVO components as needed (410), sum the components (412), and output the revised COVO estimate (414). This revision process may be repeated as desired.

Figure 6:
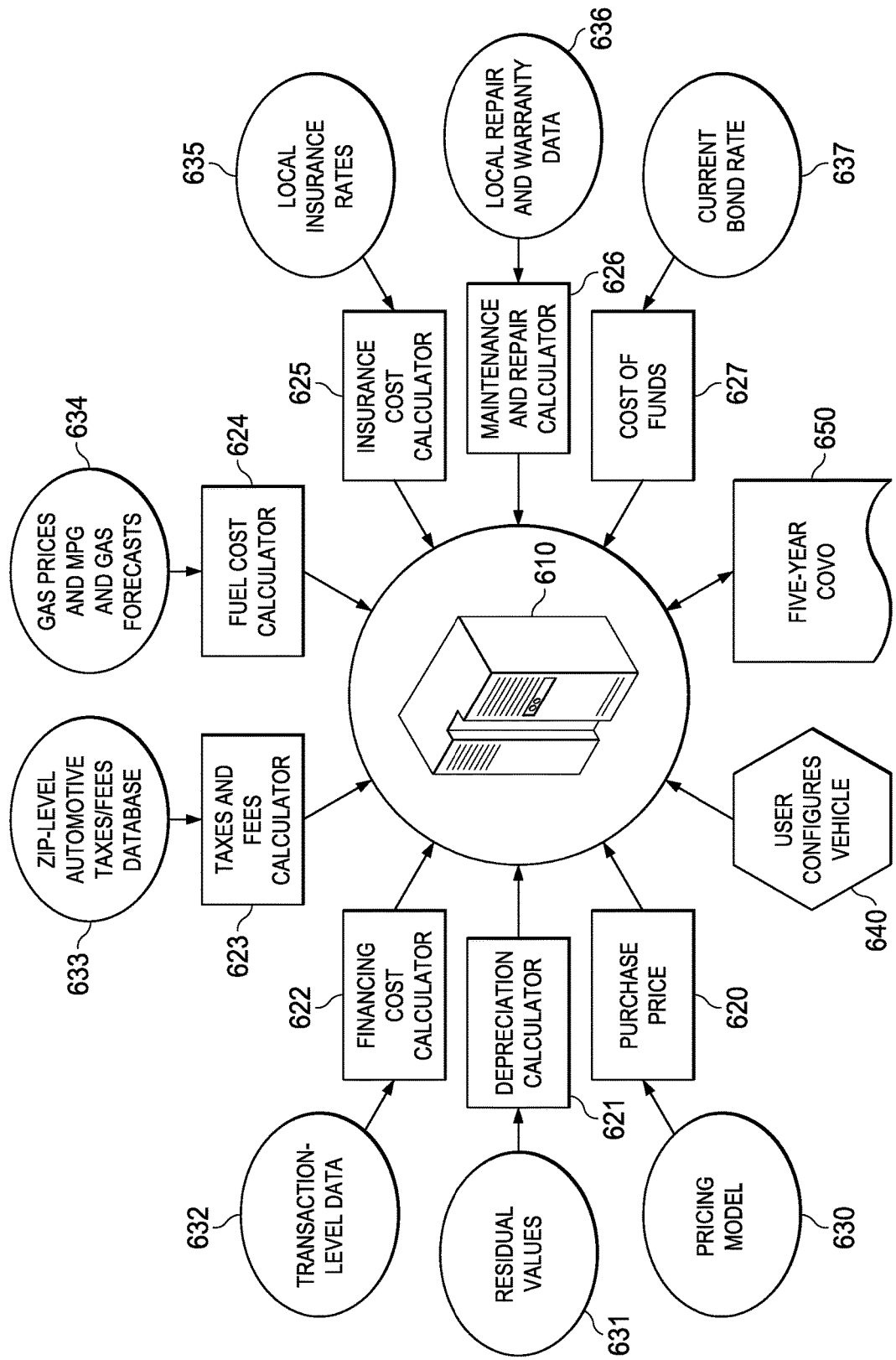
FIG. 6 is a diagram illustrating various different types of modules and data items that are used in one embodiment to compute COVO.

Referring to FIG. 6, a diagram illustrating various different types of modules and data items that are used in one embodiment to compute COVO is shown. In this figure, a central COVO module 610 receives input from a user 640 that determines the configuration of the vehicle of interest. This user input may include information that is applicable to an entire class of vehicles, such as the make, model and year of the vehicle, and it may also include information that is more specific to a particular vehicle, such as the mileage of the vehicle, the general condition of the vehicle, and so on. The user may also provide input that defines other factors which are relevant to the COVO computation. These factors may be vehicle-related, such as the number of miles that the user drives each month, or they may be non-vehicle-related, such as the user's credit rating. The user also provides input to determine the interval(s) over which COVO will be determined.

Central COVO module 610 interacts with various other modules that perform different portions of the data processing involved in the generation of COVO. The processing performed by these modules includes the computation of the various COVO components. After the user has provided the initial inputs to begin the process of producing the COVO estimate, central COVO module 610 controls component modules 620-627 to retrieve or request the various data items required to compute the COVO components.

For example, purchase price component module 620 is configured to determine the purchase price of the vehicle of interest. As depicted in the figure, purchase price component module 620 receives information from a separate pricing model data source 630. Pricing model data source 630 may, for instance, determine a purchase price as disclosed in U.S. patent application Ser. No. 13/967,148, filed Aug. 14, 2013, entitled "SYSTEM, METHOD AND COMPUTER PROGRAM FOR FORECASTING RESIDUAL VALUES OF A DURABLE GOOD OVER TIME," which is fully incorporated herein. Alternatively, the determination of the purchase may involve looking up or requesting a manufacturer's suggested list price, an average advertised dealer price, or other price estimate. The purchase price information is provided by the purchase price component module 620 to central COVO module 610 and may be used by this or other modules.

Depreciation calculator module 621 determines depreciation costs associated with the vehicle of interest. Depreciation calculator module 621 may receive the purchase price information generated by module 620 to use as a starting point in the computation of the vehicle's depreciation. Depreciation calculator module 621 may retrieve pre-calculated residual value curves from residual value data source 631.

Financing cost calculator module 622 determines costs associated with the financing of the vehicle of interest. Financing cost calculator module 622 obtains transaction-level data from data source 632, as well as purchase price information that may have been generated by purchase price module 620, down payment information from user 640, and other relevant information, and computes costs such as may be associated with a loan that the user makes in order to purchase the vehicle.

Taxes and fees calculator module 623 determines the taxes that are associated with the purchase of the vehicle of interest. Preferably, the geographical location of the user is known, either from direct user input or by derivation of the location from other information associated with the user, so that the specific taxes applicable in the user's location can be determined. The taxes can be looked up in a corresponding database 633, queried from external data sources, or otherwise determined. Fees that are associated with the purchase of the vehicle (e.g., license fees, title fees, etc.) are likewise determined for the user's geographical location if possible.

Fuel cost calculator module 624 determines the cost of fuel based on information that may include mileage (MPG) estimates for the vehicle of interest, estimates of the mileage that the vehicle will be driven, current fuel prices and forecasts of future fuel prices. These pieces of information may be retrieved from data sources of various types, including databases of pre-calculated information, user input, etc. 634.

Insurance cost calculator module 625 makes use of information associated with the user to determine the costs of insurance for the vehicle of interest. Insurance cost calculator module 625 may use the user's location to determine local insurance rates from a database (e.g., 635), or it may be able query a third party data source such as an insurance company for information that is specifically applicable to the user for whom COVO is being estimated.

Maintenance and repair calculator module 626 identifies expected repairs and maintenance for the vehicle of interest and accesses a database of repair costs 636 to look up costs associated with the expected repairs and maintenance. The repair and maintenance costs are preferably specific to the vehicle of interest and the user's location. Maintenance and repair calculator module 626 may also be able to access warranty information (636) for the vehicle in order to account for repairs and maintenance that may be covered by warranties.

Cost of funds module 627 adjusts the computation of COVO to account for the lost return that would have been available to a consumer if the money invested in the vehicle had been invested in other projects. The cost of funds may also be referred to as opportunity cost or discount rate. Cost of funds module 627 may receive data such as current bond rates from external sources 637.

Central COVO module 610 receives input from component modules 620-627 and generates an estimated COVO 650, which is provided to the user. In one embodiment, the system is interactive, and the user may input data to the system to modify or override data used in the initial computation (or subsequent computations) of COVO.

The specific implementation of the COVO calculations can vary from one embodiment to another. In one embodiment, a general approach for determining cost of ownership can include determining the following components:

$P_{0,i}$=Price of vehicle at year 0 for vehicle i=purchase price
$P_{t,i}$=Price (value) of vehicle i at year t
$\delta_t$=Principal that is left on the loan at time t
$S_{t,\gamma}$=Sales ratio at time t and mode of sale $\gamma$ (fraction of full-value based on disposal choice: trade-in or private party sale)
$g_{t,\phi}$=Average fuel costs at time t and location $\phi$
$T_{\phi,i}$=Vehicle tax rate at location $\phi$ and vehicle i
$F_{t,\phi,i}$=Vehicle fees at time t, location $\phi$, and vehicle i
$I_{t,\phi,i}$=Insurance costs at time t, location $\phi$, and vehicle i
m=Avg annual mileage
$M_{t,\phi,i,m}$=Maintenance & Repair costs at time t, location $\phi$, vehicle i, and avg annual mileage m
$f_{\phi,\omega}$=finance rate (monthly apr) for location $\phi$ and buyer credit score $\omega$
$\rho_i$=Miles Per Gallon for vehicle i
$D_j$=Down payment of user j
$\theta$=Cost of funds
$C_t$=Cost of ownership since inception as of year t in t=0 dollars $\nabla_t^y=$ $$\frac{1}{(1+12\Theta y)^t},$$

the discount factor at year t $$\nabla_n^m = \frac{1}{(1+\Theta m)^n},$$

where n=# of months
T=# of years on which to perform the calculation (# years of ownership)
N=# of months of ownership (12×T) $N_L$=Duration of loan
In this embodiment, a cumulative COVO ($C_{T,\phi,i,m,\omega}$) can be determined as follows:

$$C_{T,\varphi,i,m,\omega} = D + \tau_{\varphi,i}P_{0,i} + F_{0,\varphi,i} + I_{0,\varphi,i} + \sum_{n=1}^{N}\{\nabla_n^m \cdot (g_{n,\varphi}\rho_i m)\} +$$

$$\sum_{n=1}^{min(N_L,N)}\left\{\nabla_n^m \cdot \left(\frac{f_{\varphi,\omega}(1+f_{\varphi,\omega})^{N_L}}{(1+f_{\varphi,\omega})^{N_L}-1}(P_{0,i}-D_j)\right)\right\} +$$

$$\sum_{t=1}^{T}\{\nabla_t^y \cdot (I_{t,\varphi,i} + M_{t,\varphi,i,m} + F_{t,\varphi,i})\} - \nabla_t^y(S_{T,\gamma}P_{T,i} - \delta_T)$$

The incremental COVO for year T relative to year T−1 is:
$C_{T,\phi,i,m,\omega} - C_{T-1,\phi,i,m,\omega}$=Fuel+Fees+Insurance+Maintenance & Repair+Financing & Depreciation. Splitting each component out, the following can be determined:
Fuel: $\Sigma_{n=N-12}^{N}\{\nabla_n^m \cdot (g_{n,\phi}\rho_i m)\}$
Insurance+Maintenance+Fees: $\nabla_{t+1}^y \cdot (I_{T+1,\phi,i} + M_{T+1,\phi,i,m} + F_{T+1,\phi,i})$
Financing+Depreciation:

$$\sum_{n=N-12}^{min(N_L,N)}(\text{if } n < N_L, 1; \text{else } 0) \cdot \left\{\nabla_n^m \cdot \left(\frac{f_{\varphi,\omega}(1+f_{\varphi,\omega})^{N_L}}{(1+f_{\varphi,\omega})^{N_L}-1}(P_{0,i}-D_j)\right)\right\} +$$

$$\nabla_{t-1}^y \cdot (S_{T-1,\gamma}P_{T-1,i} - \delta_{T-1}) - \nabla_t^y \cdot (S_{T,\gamma}P_{T,i} - \delta_T)$$

Thus, the incremental COVO includes the net present value (NPV) of gas used over the year, insurance/maintenance and fees, and loan payments made plus depreciation. Financing+Depreciation are lumped together in this embodiment because they are very much intertwined. The depreciation component of the last item is:

$$\nabla_{t-1}^y \cdot S_{T-1,\gamma}P_{T-1,i} - \nabla_{Y=T}^y S_{T,\gamma}P_{T-1,i}$$

representing the present value of the disposal value at T−1, less the present value of the disposal value at T. Depreciation over the year is the reduction in proceeds from disposal resulting from the delay in disposal.
The financing part is thus:

$$\sum_{n=N-12}^{min(N_L,N)}(\text{if } n < N_L, 1; \text{else } 0) \cdot \left\{\nabla_n^m \cdot \left(\frac{f_{\varphi,\omega}(1+f_{\varphi,\omega})^{N_L}}{(1+f_{\varphi,\omega})^{N_L}-1}(P_{0,i}-D_j)\right)\right\} +$$

$$\nabla_t^y \cdot \delta_T - \nabla_{t-1}^y \cdot \delta_{T-1},$$

representing the present value of loan payments less the present value of the reduction in the loan value.

Note that many of these subscripts could be simplified if user j has information specific to his/her vehicle or situation. In the absence of such specific information, a system (e.g., an embodiment of vehicle data system 320) may leverage methodologies disclosed herein for assigning accurate values for these factors.

Further details on the vehicle depreciation component will now be described.

Cars lose value the moment they are driven off of the lot, and continue to depreciate as time goes on. In some embodiments, vehicle price for vehicle i, at time t, $P_{T,i}$, can be computed according to a residual risk analysis approach. For discussion and examples of an appropriate residual risk analysis approach, readers are directed to U.S. Patent Application No. 61/756,363, filed Jan. 24, 2013, entitled, "RESIDUAL RISK ANALYSIS SYSTEM, METHOD AND COMPUTER PROGRAM PRODUCT THEREFOR," which is incorporated by reference herein in its entirety.

Essentially, depreciation factors $d_{t,i}$, are generated for the vehicle at any given future time. The vehicle's value is constructed by multiplying the depreciation factor by the vehicle's MSRP: $P_{T,i}=d_{t,i}P_{MSRP}$. This value $P_{T,i}$ can then be used in the formula for depreciation above.

Further details on the sales ratio ($S_{t,\gamma}$) component will now be described.

The value of a vehicle can be scaled by a factor when the user is looking to sell the vehicle, as it is unlikely that the user will get that exact value for his or her vehicle. The sales ratio ($S_{t,\gamma}$) can be utilized to handle this issue. This can be computed by first identifying the vehicle's value in time t (as mentioned above). Historical transactions data for the appropriate mode of sale can then be used to generate the average ratio of sale to value: $S_{t,\gamma}=\sigma_{t,\gamma}/P_t$ where
$\sigma_{t,\gamma}$=transaction price of vehicle i with selling mode $\gamma$.

Note that more complex embodiments could be leveraged here, including a vehicle-specific computation of the selling price by leveraging retail sales, wholesale, and/or trade-in pricing models, as appropriate. For discussion and examples of retail pricing on used vehicles, readers are directed to U.S. patent application Ser. No. 13/554,743, filed Jul. 20, 2012, entitled, "SYSTEM AND METHOD FOR ANALYSIS AND PRESENTATION OF USED VEHICLE PRICING DATA," which is incorporated by reference herein in its entirety. For discussion and examples of wholesale/trade-in pricing on used vehicles, readers are directed to U.S. Patent Application No. 61/758,017, filed Jan. 29, 2013, entitled, "WHOLESALE/TRADE-IN PRICING SYSTEM, METHOD AND COMPUTER PROGRAM PRODUCT THEREFOR," which is incorporated by reference herein in its entirety.

Further details on the financing component will now be described.

Financing cost refers to the discounted net present value of interest paid on a vehicle. The financing cost can be dependent on the term of the loan. The nominal dollar cost can be computed via a standard amortization function and then multiplied by the Cost of Funds (COF) factor $\theta_r$. An example COF factor can consider the return available to a buyer by investing capital in other projects.

The loan APR used in the amortization function can be derived from acquired transaction data. Basic segments for the APR can be linked to credit score ranking (e.g., Excellent, Good, Fair, and Poor). In some cases, percentile cutoffs from the acquired data can be used to assign an APR to each ranking.

Auto loan payments can be set so that equal monthly payments bring the loan balance to zero as of the term of the loan. The formula for the payment size that accomplishes this result can be:

$$\text{Loan Payment} = \frac{f_{\varphi,\omega}(1+f_{\varphi,\omega})^{N_L}}{(1+f_{\varphi,\omega})^{N_L}-1}(P_{0,i}-D_j)$$

The balance of the loan at time t is:

$$p_t = \left(1 - \frac{(1+f_{\varphi,\omega})^t - 1}{(1+f_{\varphi,\omega})^{N_L}-1}\right)(P_{0,i}-D_j)$$

Further details on the fuel component will now be described.

Fuel cost refers to a function of fuel efficiency or miles per gallon (MPG), miles driven, and the price of gas. Each vehicle may be rated on city and highway mpg. In some cases, a standard assumption of 55% city driving and 45% highway driving used by the U.S. Department of Energy (source: Fuel Economy Guide available at www.fueleconomy.gov/feg/pdfs/guides/feg2012.pdf) may be utilized to calculate a nominal mpg, $\rho_i$, for each vehicle. An assumption can be made that this does not change. However, an artisan skilled in the art can apply a time-dependent function here if he has improved data on fuel economy changes over time. Also, users can enter their specific highway and city miles percentage should they wish.

The average fuel costs can be temporal and geo-specific. One approach is to start with the current fuel costs $g_{0,\phi}$, averaged for each state. This data is available from many sources. One example source is U.S. Energy Information Administration which provides both current and historical regional gas prices (source: www.eia.gov/petroleum/gasdiesel/).

Getting fuel prices into the future requires a forecasting exercise. This can be done by either using the forecasts of others (for instance, Moody's) or generating one's own forecast. For example, an ARIMA model with parameters p, d, and q for gas price at time t has the form $$(1-\phi_1 B - \ldots - \phi_p B^p)(1-B)^d g_t = c + (1+\psi_1 B + \ldots + \psi_q B^q)\epsilon_t,$$

where p is the order of the autoregressive component, d is the degree of first difference involved, q is the order of the moving average part, and B is the backshift/lag operator.

Forecasts for future gas prices can be obtained by first estimating the model parameters ($\phi$'s, $\psi$'s, and c) and then applying the autoregressive forecasting procedure.

Further details on the taxes and fees component will now be described.

Calculating taxes and fees can be straightforward but potentially tedious. To do this properly requires geographic granularity and vehicle specification precision. As fees can vary by vehicle configuration specifications, this must be accounted for. The invention leverages a proprietary database of tax rates and registration fees by zip code. This proprietary database is considered to contain the most complete set of local tax/fee data. The local tax rate is applied to the expected purchase price to obtain the sales tax for the purchase of the vehicle in the buyer's region. Also, the annual registration fees are calculated for the vehicle over the 5-year period.

$T_1$=Average Paid*(Sales Tax)+Average Paid*(Registration Tax)+Title Fee $T_{1+i}$=Depreciation Value*(Registration Tax)

Taxes and registration fee data comes from local government sites and DMV registration data. Documentation fees, which can be a significant amount, can come from dealers participating in a dealer network. For discussion and examples of how taxes and fees can be calculated, readers are directed to U.S. Patent Application No. 61/758,026, filed Jan. 29, 2013, entitled, "OUT-OF-THE-DOOR PRICING SYSTEM, METHOD AND COMPUTER PROGRAM PRODUCT THEREFOR," which is incorporated by reference herein in its entirety.

Further details on the maintenance and repair component will now be described.

The maintenance and repair computations, are quite involved and represent one major technological advancement provided by the invention. More specifically, historical repair data may be obtained from an external, third-party provider. Converting this information to the final Maintenance and Repair costs requires computation. Embodiments provide multiple approaches to handle these calculations.

One embodiment includes Expected repair costs=(Expected # repairs)(Expected repair cost for each repair). Or stated more formally:

$$c_{i,t} = \sum_\mu (E[R_{\mu,i,t}]E[c_{\mu,i,t} \mid R_{\mu,i,t}])$$

(Expected # repairs)=$E[R_{\mu,i,t}]$ can be generated by evaluating E[#repairs per vehicle] as follows:

1. Bins for each YMM (and mileage per year factors) are generated. The most recent relevant data is used by year to represent the YMM in future years. Two approaches that can be taken:
   YMM(t)=(Y−t)MM(0), where YMM(t) is the Year, Make, Model that the practitioner is looking to compute for in year t, t∈1, 2, 3, . . . .
   The practitioner could also filter for vehicles with similar mileage per year characteristics: YMMm(t)=(Y−t)MMm(0)
2. Total number of unique vehicles serviced over a duration by YMM is counted.
3. Total number of unique vehicles by YMM on road over duration is estimated.
   This estimate can be generated by taking total # sales of vehicles by YMM (when new).
   Note that the practitioner could also generate a shelving factor that takes a certain portion of those vehicles out of circulation by time, but this is likely unnecessary for the duration over which the cost of ownership will be applied.
4. The ratio of the # vehicles with any maintenance or repair services to the total number of vehicles on the road (#2) can be created to generate a coverage index, $\emptyset_{i,b}$, for vehicle i, brand b.
5. The factor, percent servicing not reported, $\partial_{i,\mu}$, is constructed. It can be done for each individual repair item μ. This can be a heuristic measure assigned by the practitioner, or leverage external sources. One example source may be Kelton Research for Honeywell which conducts surveys and provides data that could be used for these factors. For examples of data that could be used for these factors, readers are directed to Charles Plueddeman, "Auto Repair: Do It Yourself, but Do It Right" (which is available at editorial.autos.msn.com/listarticle.aspx?cp-documentid=1088044&page=0 and which is incorporated by reference herein in its entirety), and "Honeywell Survey Finds Majority of Americans Taking Car Care Into Their Own Hands," PR Newswire, United Business Media (which is available at www.prnewswire.com/news-releases/honeywell-survey-finds-majority-of-americans-taking-car-care-into-their-own-hands-62073502.html and which is incorporated by reference herein in its entirety.) Note that for major repair items, it might be expected that $\partial_{i,\mu}$ approaches 0%, whereas for unscheduled, minor repairs, it might be a bit higher.

6. Assuming a matrix of vehicle repairs in our database and values of $\partial_{i,\mu}$, for each vehicle bin i, take for each time duration t and constructed like bin of vehicles, $\max_i[R_{ij}/(1-\partial_{i,j})]=N_i$, $\emptyset_i=N_i/s_i$, where $s_i$=total # of sales for vehicle i during that duration of time. Letting j=µ as an index across all repairs in the database, we have the following:

$$\{\partial_{i,j}\} = \begin{pmatrix} \partial_{11} & \cdots & \partial_{1j} \\ \vdots & \ddots & \vdots \\ \partial_{i1} & \cdots & \partial_{ij} \end{pmatrix},$$

$$\{R_{i,j}\} = \begin{pmatrix} R_{11} & \cdots & R_{1j} \\ \vdots & \ddots & \vdots \\ R_{i1} & \cdots & R_{ij} \end{pmatrix},$$

$\emptyset_i=N_i/s_i$, where $s_i$=total # of sales for vehicle i during that duration of time. This effectively handles much of the sparse data issue and provides a reasonable estimate for repair vehicle coverage in the database. This overall coverage metric can then be used in the next step to scale each of the individual estimate repairs per vehicle.

7. This combination of the coverage index and the self-servicing data is then used to construct the E[#repairs per vehicle]

E[#repairs per vehicle] for routine maintenance can be generated from manufacturer website owner's manuals. So, for any given routine maintenance item, the E[#repairs per vehicle] can be computed by taking the mileage driven over that duration divided by mileage frequency of suggested repairs.

For major or unscheduled repairs, the practitioner would compute as follows:
i. Step 1: construct bin of like vehicles on which to calculate
ii. Step 2: compute frequency of a particular repair in the dataset
iii. Step 3: scale frequency by coverage and
E[#repairs per vehicle and repair type]=num repairs/(1−delta)*coverage or stated more formally:
E[#repairs per vehicle and repair type]=$R_{\mu,i,t}/((1-\partial_{i,\mu,t})\emptyset_{i,t})$ The E[repair costirepair]=$E[c_{\mu,i,m,t}|R_{\mu,i,t}]$ can be computed as follows:

Step 1: Review manufacturer warranty info to ensure repairs (& maintenance) are correctly categorized. For those items under warranty, the practitioner will want to zero out costs in the cost of ownership computation.

Step 2: Repairs not under warranty. Compute historical average costs for repairs of that type, $c_{i,\mu,m,t}$, for repairs in time t for vehicles with similar mileage driving habits. This must be done at the bin level and should be using the most recent data available.

Step 3: Construct maintenance inflation rate factors: Leveraging historical repair data, the average annual maintenance inflation rate factor can be calculated:

$$r_{i,\mu} = 1 - \frac{1}{T_i}\sum_{t_i=1}^{T_i}\left(\frac{c_{i,\mu,m,t+1}}{c_{i,\mu,m,t}}\right),$$

where c is average repair cost. Note that with sparse data, the embodiment could be modified to compute this factor at the brand level and/or repair-type level.

Step 4: $E[c_{\mu,i,m,t}|R_{\mu,i,t}]=(1+r_{i,\mu})^t c_{i,\mu,m,t}$, in which historical data can be used to project costs ahead.

Finally, the Expected Repair Costs=E[Number of repairs per vehicle]*E[$R_{i,\mu,m,t}$|repair] can be determined. Or stated more formally:

$$C_{\mu,i,t}=E[R_{\mu,i,t}]E[c_{\mu,i,t}|R_{\mu,i,t}]$$

Note that the subscript m is being treated loosely as the practitioner can choose the level of granularity on which to apply these calculations: at either the vehicle level i or the vehicle-mileage level i,m Summing this up over all repair types per vehicle, we get:

$$c_{i,t} = \sum_{\mu}(E[R_{\mu,i,t}]E[c_{\mu,i,t}|R_{\mu,i,t}])$$

Further details on the insurance component will now be described.

Insurance rates can be derived from a proprietary insurance model, built using actual insurance data. Insurance quotes are grouped by vehicle bins (e.g., year, make, model, and body type) and geography (e.g., county or state). For each grouping, the average annual insurance cost is calculated. This average insurance cost is the expected annual insurance cost for the driver in the upcoming year for the selected vehicle in a locale, for instance, a user specified zip code. The locale information may be obtained from another means such as the user's browsing history. Furthermore, the specificity of the locale may depend on the granularity of data available to the system.

This insurance rate is averaged across similar vehicles within a geographic region across individuals that differ across a variety of factors: annual miles driven, coverage type (liability only or with collision, etc.), prior number of claims, claim amount, etc. To adjust for these sources of variability within the population, a linear regression model can be applied to account for these differences:

$I_{o,\phi,i}=\beta_0+\beta_1$*(annual mileage)+$\beta_2$*(coverage type)+$\beta_3$*(# of prior claims)+$\beta_4$*(average claim amount)

The quantity $I_{o,\phi,i}$ refers to the insurance cost for the driver in the upcoming year. A user can input annual mileage, coverage type, etc. If these parameters are not set by the user, the default settings corresponding to a typical driver is used.

As future insurance rates almost always increase and adjust from this base rate, future rates can be computed as a ratio of prior rates based on the average historical annual rate increase, $\alpha_{\phi,i}$:

$$I_{t+1,\phi,i}=(1+\alpha_{\phi,i})I_{t,\phi,i}$$

In some embodiments, users can change, isolate, and set limits with respect to the above-described components. If a user configurable parameter is not set, then a default setting or dynamically generated value may be used. For example, a user may provide insurance rate information. If the user does not provide the insurance rate information, the system may derive the insurance rate information as described above.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments of the invention described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

The benefits and advantages which may be provided by the invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system for determining costs of vehicle ownership, the system comprising:
   a computer processor;
   a network interface coupled to the processor;
   a data storage device coupled to the processor;
   wherein the processor is configured to
      receive a request over the network interface including information identifying a user-specified vehicle of interest and a user-specified ownership interval of interest over the network interface,
      respond to the request over the network interface in real-time using the processor configured to:
      identify one or more pre-calculated data items that are stored in the data storage device and retrieve the identified pre-calculated data items from the data storage device,
      request one or more external data items from an external data source and receive the requested external data items from the external data source via the network interface asynchronously to the retrieval of the identified pre-calculated data items from the data storage device of the system,
      compute a cost of vehicle ownership for the vehicle of interest using the one or more pre-calculated data items, wherein the cost of vehicle ownership is the cost incurred while owning the user-specified vehicle during the user-specified ownership interval, the cost is expressed as a net present value, and at least one of the one or more pre-calculated data items is associated with a repair cost for the user-specified vehicle during the user-specified ownership interval and the repair cost is determined based on one or more bins of repair data, each bin of historical repair data associated with a year, make and model of the user-specified vehicle of interest, and
      output the cost of vehicle ownership for the vehicle of interest to a user in real-time via the network interface.

2. The system of claim 1, wherein the processor is configured to sum a plurality of subcomponents of the cost of vehicle ownership, wherein the subcomponents include at least one of the pre-calculated data items, at least one of the requested external data items, and at least one user-supplied data item.

3. The system of claim 2, wherein the processor is configured to:
   provide a plurality of default data items; and
   enable replacement of one or more of the default data items with corresponding ones of the user-supplied data items in response to receiving the user-supplied data items from the user.

4. The system of claim 1, wherein the processor is configured to:
   after outputting the cost of vehicle ownership, receive user input;
   revise one or more of the pre-calculated data items, requested external data items or user-supplied data items according to the received user input;
   recompute the cost of vehicle ownership for the vehicle of interest; and
   output the recomputed cost of vehicle ownership to the user via the output device.

5. The system of claim 1, wherein the processor is configured to:
   identify location information associated with the user;
   select one or more of the pre-calculated data items, requested external data items or user-supplied data items based at least in part on the identified location information; and
   compute the cost of vehicle ownership for the vehicle of interest using the selected, user-location-based data items.

6. The system of claim 1, wherein the processor is configured to:
   receive vehicle-specific information associated with the vehicle of interest;
   select one or more of the pre-calculated data items, requested external data items or user-supplied data items based at least in part on the received vehicle-specific information; and
   compute the cost of vehicle ownership for the vehicle of interest using the data items selected based on the received vehicle-specific information.

7. The system of claim 1, wherein the processor is configured to:
   identify one or more expected repair items associated with the vehicle of interest;
   look up itemized repair costs associated with the vehicle of interest for the identified expected repair items in a database of stored repair costs;
   compute total repair costs specific to the vehicle of interest for the identified expected repair items; and
   sum the total repair costs with one or more other subcomponents of the cost of vehicle ownership.

8. A method for determining costs of vehicle ownership, the method comprising:
   receiving a request at a computer system over a computer network, wherein the request identifies a user-specified vehicle of interest and a user-specified ownership interval of interest over a network interface;
   responding to the request over the computer network in real-time by:
   identifying one or more pre-calculated data items that are stored in a data storage device coupled to the computer system and retrieving the identified pre-calculated data items from the data storage device;
   requesting one or more external data items from a data source external to the computer system and receiving the requested external data items from the external data source via the network interface asynchronously to the retrieval of the identified pre-calculated data items from the data storage device of the system;
   computing a cost of vehicle ownership for the vehicle of interest using the one or more pre-calculated data items, wherein the cost of vehicle ownership is the cost incurred while owning the user-specified vehicle during the user-specified ownership interval, the cost is expressed as a net present value, and at least one of the one or more pre-calculated data items is associated with a repair cost for the user-specified vehicle during the user-specified ownership interval and the repair cost is determined based on one or more bins of repair data, each bin of historical repair data associated with a year, make and model of the user-specified vehicle of interest, make and model of the user-specified vehicle of interest; and
   outputting the cost of vehicle ownership for the vehicle of interest to a user via the network interface.

9. The method of claim 8, wherein computing the cost of vehicle ownership for the vehicle of interest comprises summing a plurality of subcomponents of the cost of vehicle ownership, wherein the subcomponents include at least one of the pre-calculated data items, at least one of the requested external data items, and at least one user-supplied data item.

10. The method of claim 9, further comprising:
providing a plurality of default data items; and
replacing one or more of the default data items with corresponding ones of the user-supplied data items in response to receiving the user-supplied data items from the user.

11. The method of claim 8, further comprising:
after outputting the cost of vehicle ownership, receiving user input;
revising one or more of the pre-calculated data items, requested external data items or user-supplied data items according to the received user input;
recomputing the cost of vehicle ownership for the vehicle of interest; and
outputting the recomputed cost of vehicle ownership to the user via the output device.

12. The method of claim 8, further comprising:
identifying location information associated with the user;
selecting one or more of the pre-calculated data items, requested external data items or user-supplied data items based at least in part on the identified location information; and
computing the cost of vehicle ownership for the vehicle of interest using the selected, user-location-based data items.

13. The method of claim 8, further comprising:
receiving vehicle-specific information associated with the vehicle of interest;
selecting one or more of the pre-calculated data items, requested external data items or user-supplied data items based at least in part on the received vehicle-specific information; and
computing the cost of vehicle ownership for the vehicle of interest using the data items selected based on the received vehicle-specific information.

14. The method of claim 8, further comprising:
identifying one or more expected repair items associated with the vehicle of interest;
looking up itemized repair costs associated with the vehicle of interest for the identified expected repair items in a database of stored repair costs;
computing total repair costs specific to the vehicle of interest for the identified expected repair items; and
summing the total repair costs with one or more other subcomponents of the cost of vehicle ownership.

15. A computer program product comprising at least one non-transitory computer-readable storage medium storing computer instructions that are translatable by a processor to perform:
receiving a request at a computer system over a computer network, wherein the request identifies a user-specified vehicle of interest and a user-specified ownership interval of interest over a network interface;
responding to the request over the computer network in real-time by:
identifying one or more pre-calculated data items that are stored in a data storage device coupled to the computer system and retrieving the identified pre-calculated data items from the data storage device;
requesting one or more external data items from a data source external to the computer system and receiving the requested external data items from the external data source via the network interface asynchronously to the retrieval of the identified pre-calculated data items from the data storage device of the system;
computing a cost of vehicle ownership for the vehicle of interest using the one or more pre-calculated data items, wherein the cost of vehicle ownership is the cost incurred while owning the user-specified vehicle during the user-specified ownership interval, the cost is expressed as a net present value, and at least one of the one or more pre-calculated data items is associated with a repair cost for the user-specified vehicle during the user-specified ownership interval and the repair cost is determined based on one or more bins of repair data, each bin of historical repair data associated with a year, make and model of the user-specified vehicle of interest, make and model of the user-specified vehicle of interest; and
outputting the cost of vehicle ownership for the vehicle of interest to a user via the network interface.

16. The computer program product of claim 15, wherein computing the cost of vehicle ownership for the vehicle of interest comprises summing a plurality of subcomponents of the cost of vehicle ownership, wherein the subcomponents include at least one of the pre-calculated data items, at least one of the requested external data items, and at least one user-supplied data item.

17. The computer program product of claim 16, further comprising computer instructions that are translatable by the processor to perform:
providing a plurality of default data items; and
replacing one or more of the default data items with corresponding ones of the user-supplied data items in response to receiving the user-supplied data items from the user.

18. The computer program product of claim 15, further comprising computer instructions that are translatable by the processor to perform:
after outputting the cost of vehicle ownership, receiving user input;
revising one or more of the pre-calculated data items, requested external data items or user-supplied data items according to the received user input;
recomputing the cost of vehicle ownership for the vehicle of interest; and
outputting the recomputed cost of vehicle ownership to the user via the output device.

19. The computer program product of claim 15, further comprising computer instructions that are translatable by the processor to perform:
identifying location information associated with the user;
selecting one or more of the pre-calculated data items, requested external data items or user-supplied data items based at least in part on the identified location information; and
computing the cost of vehicle ownership for the vehicle of interest using the selected, user-location-based data items.

20. The computer program product of claim 15, further comprising computer instructions that are translatable by the processor to perform:
receiving vehicle-specific information associated with the vehicle of interest;
selecting one or more of the pre-calculated data items, requested external data items or user-supplied data items based at least in part on the received vehicle-specific information; and computing the cost of vehicle ownership for the vehicle of interest using the data items selected based on the received vehicle-specific information.

21. The computer program product of claim 15, further comprising computer instructions that are translatable by the processor to perform:
   identifying one or more expected repair items associated with the vehicle of interest;
   looking up itemized repair costs associated with the vehicle of interest for the identified expected repair items in a database of stored repair costs;
   computing total repair costs specific to the vehicle of interest for the identified expected repair items; and
   summing the total repair costs with one or more other subcomponents of the cost of vehicle ownership.

22. A system for determining costs of vehicle ownership, the system comprising:
   a computer processor;
   a network interface coupled to the processor;
   a data storage device coupled to the processor;
   wherein the processor is configured to:
      receive a request over the network interface, the request identifying a user-specified vehicle of interest and a user-specified ownership interval of interest over the network interface,
      respond to the request over the network interface in real-time using the processor configured to:
         identify one or more pre-calculated data items that are stored in the data storage device and retrieve the identified pre-calculated data items from the data storage device,
         request one or more external data items from an external data source and receive the requested external data items from the external data source via the network interface asynchronously to the retrieval of the identified pre-calculated data items from the data storage device of the system,
         compute a cost of vehicle ownership for the vehicle of interest using the one or more pre-calculated data items, wherein the cost of vehicle ownership is the cost incurred while owning the user-specified vehicle during the user-specified ownership interval, the cost is expressed as a net present value, and at least one of the one or more pre-calculated data items is associated with a repair cost for the user-specified vehicle during the user-specified ownership interval and the repair cost is determined based on one or more bins of historical repair data, each bin of repair data associated with a year, make and model (YMM) of the user-specified vehicle of interest by estimating the expected number of repairs and the expected repair cost for each repair for each bin of YMM of the user-specified vehicle of interest, and
         output the cost of vehicle ownership for the vehicle of interest to a user via the network interface.

\* \* \* \* \*